United States Patent [19]

Keizer

[11] 4,104,832
[45] Aug. 8, 1978

[54] METHOD FOR FORMING KEEL-TIPPED STYLUS FOR VIDEO DISC SYSTEMS

[75] Inventor: Eugene Orville Keizer, Princeton, N.J.

[73] Assignee: RCA Corporation, New York, N.Y.

[21] Appl. No.: 781,302

[22] Filed: Mar. 25, 1977

[51] Int. Cl.² ............................................. B24B 1/00
[52] U.S. Cl. ................................... 51/281 R; 274/38; 360/122
[58] Field of Search ................. 51/5 R, 160, 162, 204, 51/206 R, 209 R, 209 S, 210, 281 R, 284 E, 326; 179/100.41 J, 100.4 M; 274/38; 360/122

[56] References Cited

U.S. PATENT DOCUMENTS

| | | | |
|---|---|---|---|
| 1,197,141 | 9/1916 | Mergenthaler | 51/5 R |
| 1,817,094 | 8/1931 | Moore | 274/38 |
| 2,350,732 | 4/1975 | Dickopp | 51/209 R |
| 3,826,877 | 7/1974 | Leedom | 274/38 |
| 3,842,194 | 10/1974 | Clemens | 274/38 X |
| 3,877,705 | 4/1975 | Joschko | 274/38 |
| 4,031,546 | 6/1977 | Leedom | 274/38 X |

*Primary Examiner*—Gary L. Smith
*Attorney, Agent, or Firm*—Eugene M. Whitacre; William H. Meagher; Dilip A. Kulkarni

[57] ABSTRACT

A keel-tipped stylus comprises a tapering body, a fore-and-aft constricted terminal portion and shoulders joining the tapering body to the constricted terminal portion. To form a keel-tipped stylus, a tapering support element, made from hard material—such as diamond or sapphire— is run on an abrasive lapping disc having a deep coarse-pitched groove. The lands on the lapping disc lap the shoulders of the keel-tipped stylus and the walls of the abrasive groove form the substantially parallel fore-and-aft surfaces of the constricted terminal portion. The abrasive groove can be deeper than the height of the keel tip; in that case, the bottom surface of the constricted terminal portion can be lapped later. Alternately, the bottom of the abrasive groove can be positioned such that it laps the bottom surface of the constricted terminal portion during the concluding portion of the keel-lapping procedure.

8 Claims, 13 Drawing Figures

METHOD FOR FORMING KEEL-TIPPED STYLUS FOR VIDEO DISC SYSTEMS

The present invention relates to a novel disc record playback system of a form suitable for playback of high density information records such as video discs, and to a method for forming a novel stylus structure advantageous for use in such playback systems.

BACKGROUND OF THE INVENTION

In U.S. Pat. No. 3,842,194 issued on Oct. 15, 1974 to Jon K. Clemens, a video playback system of a variable capacitance form is disclosed. In one configuration of the Clemens system, information, representative of recorded picture and sound, is encoded in a relatively fine spiral groove on the surface of a disc record (e.g., groove width 3.5 micrometers, groove depth — 1.0 micrometers). The record substrate is covered with a coating of conductive material and a dielectric layer overlying the conductive coating. During playback, a pickup stylus, having a thin conductive electrode (e.g., about 0.2 micrometers thick), engages the groove as the record is rotated by a supportive turntable. Capacitive variations between the stylus electrode and the conductive coating are sensed to recover the prerecorded information.

In the systems of the above type, the use of a relatively fine record groove and the groove-engaging requirement for the pickup stylus result in a stylus tip which is extremely small.

Typicaly, the stylus support tip is defined by a prow, a substantially flat, V-shaped rear surface remote from the prow, a bottom surface extending from the bottom edge of the rear surface and a pair of side surfaces extending from the side edges of the rear surface and converging at the prow. The intersection of the rear and the side surfaces with the bottom surface forms, for example, a triangular footprint. Illustratively, the angle included between the two side edges is equal to 42°, the length of the bottom edge is about 2 micrometers, the height of the triangular footprint is about 4 micrometers and the angle between the prow and the rear surface is about 40°.

In the previously mentioned Clemens patent, two alternative forms of stylus structure are disclosed: (1) a symmetrical structure, wherein the conductive stylus electrode is "sandwiched" between dielectric support material, which extends ahead of, and behind, the electrode in symmetrical fashion (FIG. 1); and (2) an "asymmetrical" structure, wherein the stylus electrode comprises a conductive coating on the rear surface of a dielectric support (FIG. 5).

The asymmetrical stylus form has proven to be convenient for ease in stylus fabrication, in that the entire rear surface is coated with conductive material. However, the stylus electrode, being V-shaped, gets wider as the stylus structure wears out. As the stylus electrode gets wider, the spurious capacitance between the electrode and the conductive coating in the adjacent grooves becomes significant, introducing noise in the recovered signal. When the stylus electrode becomes wider than the groove width (e.g., 3.5 micrometers), it is desirable to replace the stylus.

Moreover, as both the stylus structures disclosed in Clemens get wider with the use, the used styli simultaneously cover several grooves during playback, which may introduce stylus mistracking and resultant signal distortion.

In a copending application, Ser. No. 781,317, of the applicant, entitled "KEEL-TIPPED STYLUS FOR VIDEO DISC SYSTEMS," filed concurrently herewith, a novel keel-tipped pickup stylus structure, which overcomes the above mentioned problems, is disclosed. The keel-tipped pickup stylus is suitable for playing back prerecorded signals from a disc record groove of a given width. The keel-tipped pickup stylus comprises a dielectric support element having a body, a fore-and-aft constricted terminal portion and shoulders interconnecting the body with the constricted terminal portion.

The constricted terminal portion is defined by a prow, a substantially flat rear surface remote from said prow, a plurality of substantially parallel side surfaces extending from the side edges of the rear surface, a bottom surface extending from the bottom edge of the rear surface, and a plurality of additional surfaces extending from the prow and intersecting the bottom and the side surfaces. The maximum separation between the substantially parallel side surfaces is less than the given groove width.

SUMMARY OF THE INVENTION

Pursuant to this invention, to obtain a keel-tipped stylus, a V-shaped support element is run on an abrasive lapping disc having a deep course pitched groove for a predetermined time interval. The lands on the abrasive lapping disc lap the shoulders of the keel-tipped stylus and the walls of the abrasive groove form the substantially parallel side surfaces of the constricted terminal portion. The abrasive groove can be deeper than the height of the keel tip; in that case, the lapping operation to form the bottom surface of the constricted terminal portion can be performed separately either before or after the keel-lapping procedure. Alternatively, the bottom wall of the abrasive groove can be positioned such that it laps the bottom surface of the constricted terminal portion during the concluding portion of the keel-lapping procedure.

DETAILED DESCRIPTION OF THE PREFERRED EMBODIMENT

Figure 1:
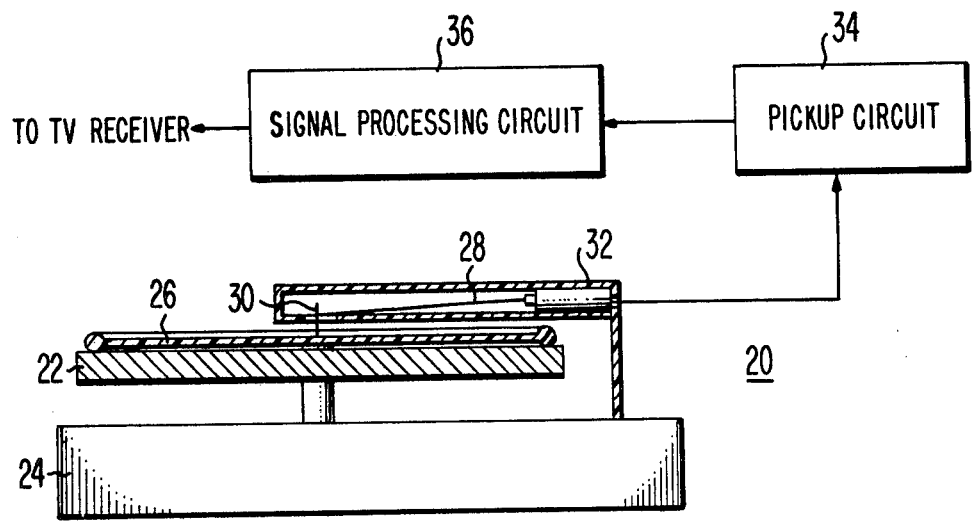
FIG. 1 illustrates a video disc system for playing back prerecorded signals recorded in a disc record groove of a given width in which a keel-tipped pickup stylus constructed in accordance with the present invention may be advantageously employed.

Referring to FIG. 1, there is illustrated therein a video disc system 20 which is illustratively of a variable capacitance type as generally shown in the aforesaid Clemens patent. The system 20 includes a turntable 22 rotatably mounted on a base 24 for rotation at a proper playback speed (e.g., 450 rpm). The turntable 22 supports and centers a video disc 26 having information, representative of picture and sound, recorded along a spiral groove disposed on the surface thereof. To obtain an adequate playback time, the groove convolutions on the video disc 26 are relatively closely spaced (e.g., groove pitch — 3.5 micrometers). As stated previously, the video disc 26 has a dielectric deposit overlying a conductive coating on the video disc substrate.

A stylus arm 28, carrying a groove-engaging pickup stylus 30 at the free end thereof, is pivotally supported at its remote end to a carriage 32. The stylus arm pivot may be of the type disclosed in U.S. Pat. No. 3,917,903 issued to B. K. Taylor, et al.

To enable the pickup stylus 30 to maintain a desired constant attitude in the video disc groove, the carriage 32 is traversed radially of the video disc 26 during playback at a speed suitably synchronized with the rotation of the video disc. The carriage traversing system may be of the type shown in U.S. Pat. No. 3,870,835 issued to F. R. Stave.

As previously indicated, the pickup stylus 30 incorporates a relatively thin electrode (e.g., 0.2 micrometers deep). The capacitance variations between the stylus electrode and the video disc conductive coating are sensed during playback by a pickup circuit 34. The output of the pickup circuit 34 is processed by a signal processing circuit 36 to a form suitable to be used by a television receiver. The pickup circuit 34 may be of the type illustrated in U.S. Pat. Appln. Ser. No. 743,144 of H. Kawamoto, et al. The signal processing circuit 36 may be of the type illustrated in U.S. Pat. No. 3,969,757 issued to J. Amery.

Figure 2:
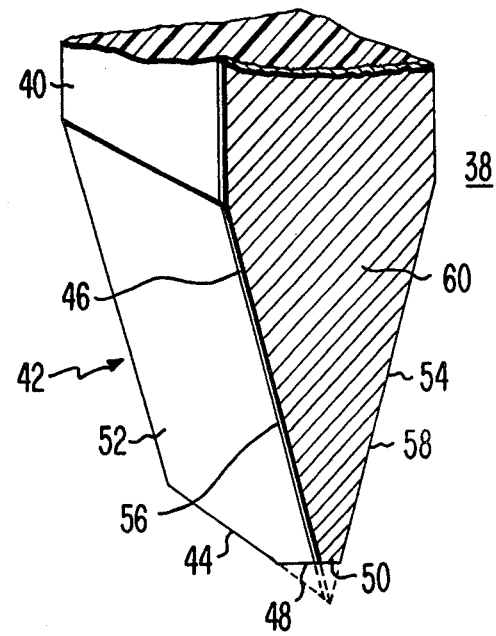
FIG. 2 shows a perspective view of prior art stylus having a V-shaped tip.

FIG. 2 shows a prior art pickup stylus having a V-shaped tip. The V-tipped pickup stylus 38 includes a dielectric support element 40 which has a V-shaped tip 42. The terminal portion of the V-shaped tip 42 is defined by a prow 44, a substantially flat rear surface 46 remote from the prow, a bottom surface 48 extending from the bottom edge 50 of the rear surface and a pair of side surfaces 52 and 54 extending, respectively, from the side edges 56 and 58 of the rear surface and intersecting at the prow. The intersection of the rear surface 46 and the side surfaces 52 and 54 with the bottom surface 48 defines for example, a triangular stylus footprint. The entire rear surface 46 of the stylus support element 40 is coated with conductive material to form an electrode 60.

Figure 3:
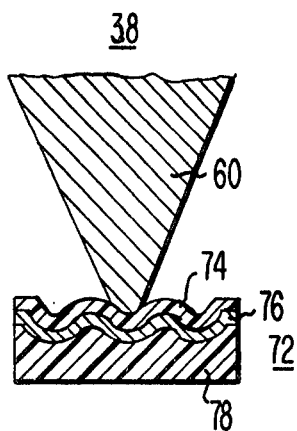
FIGS. 3, 4 and 5 depict successive steps in the life of a V-tipped stylus of FIG. 2, the V-tipped stylus being shown riding in a disc record groove.
Figure 4:
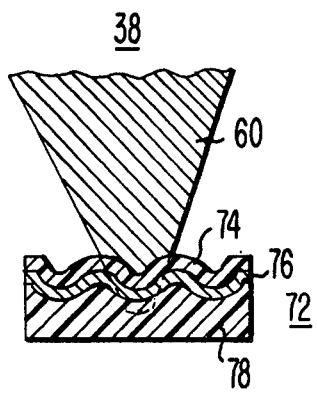
Figure 5:
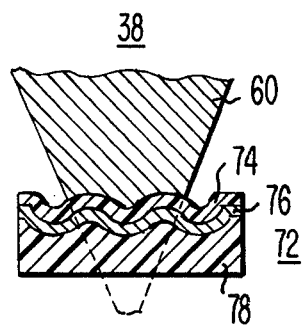

FIGS. 3, 4 and 5 show successive stages in the life of the V-shaped pickup stylus 38 riding in a groove disposed on the surface of a video disc 72 having a dielectric deposit 74 overlying a conductive coating 76 on the video disc substrate 78.

As the pickup stylus 38 wears to a shape shown in FIG. 4, the width of the stylus electrode 60 becomes the same as the distance between the adjacent grooves (e.g., 3.5 micrometers). When the stylus electrode 60 becomes wider, the cross-talk in the signal pickup output increases and it becomes desirable to replace the pickup stylus.

However, if the pickup stylus 38 is allowed to wear to a shape shown in FIG. 5, the stylus now covers several grooves and causes stylus mistracking.

Figure 6:
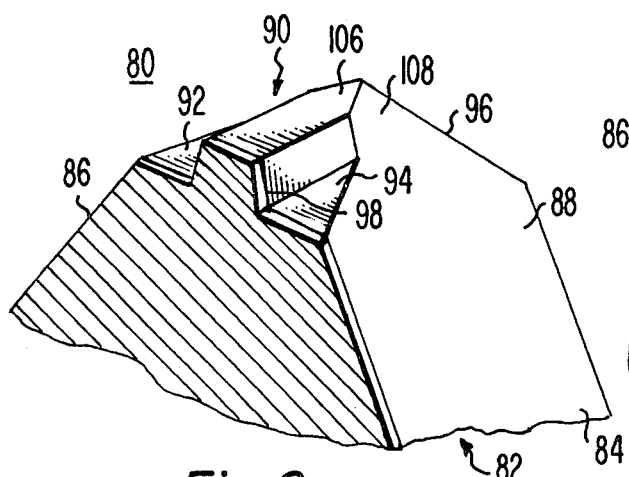
FIGS. 6 and 7 show perspective views of a keel-tipped stylus for use in the system of FIG. 1.
Figure 7:
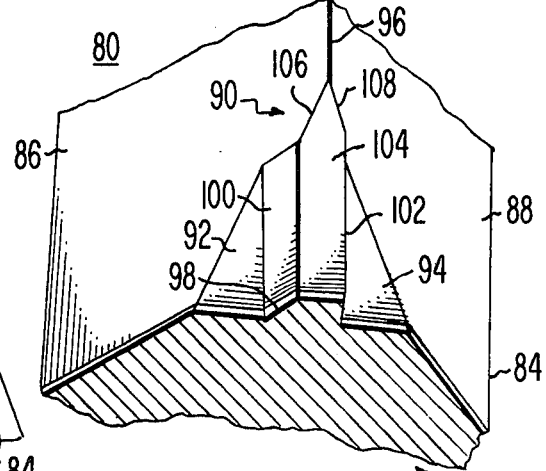
Figure 8:
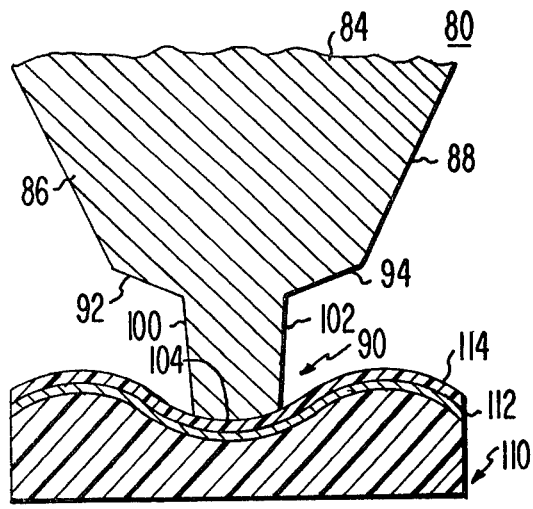
FIGS. 8 and 9 illustrate successive steps in the life of a variation of the keel-tipped stylus of FIGS. 6 and 7; the modified keel-tipped stylus being shown riding in a disc record groove.
Figure 9:
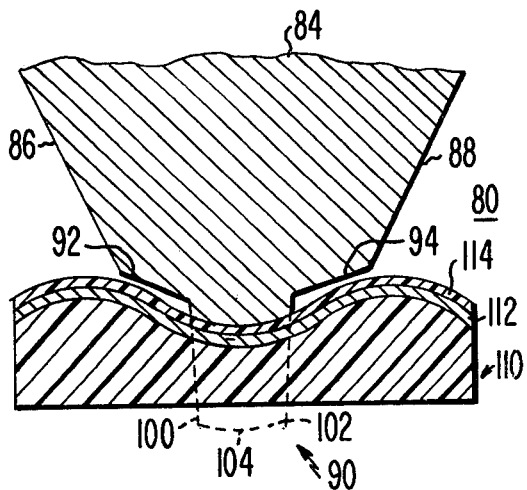
Figure 10:
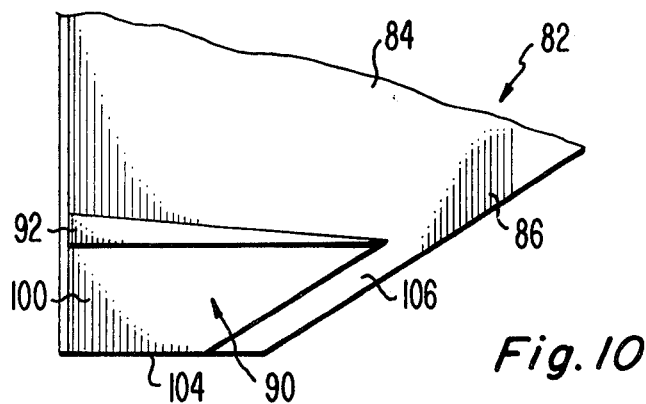
FIGS. 10 and 11 show a side view and a bottom view of the modified keel-tipped stylus of FIGS. 8 and 9.
Figure 11:
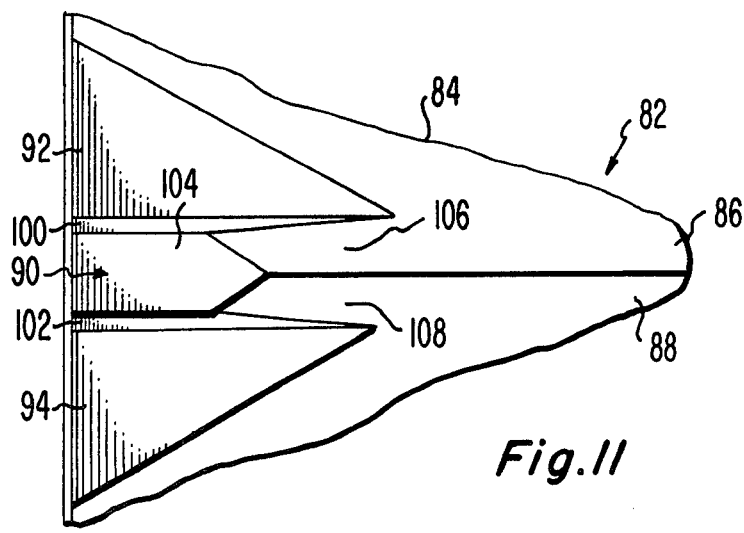

A novel keel-tipped pickup stylus overcomes these problems. FIGS. 6 and 7 show the perspective views of a keel-tipped stylus 80. FIGS. 8, 10 and 11 illustrate the front view, the side view and the bottom view of a variation of the keel-tipped stylus 80. FIG. 9 shows a worn keel-tipped stylus 80 of the type shown in FIGS. 8, 10 and 11.

As shown in the respective drawings, the keel-tipped stylus 80 includes a dielctric support element 82. The dielectric support element 82 comprises a body 84 having bevelled surfaces 86 and 88, a fore-and-aft constricted terminal portion 90 and shoulders 92 and 94 joining the bevelled body to the constricted terminal portion.

The constricted terminal portion 90 is defined by a prow 96, a substantially flat rear surface 98 remote from the prow, a pair of substantially parallel side surfaces 100 and 102 extending from the side edges of the rear surface, a bottom surface 104 extending from the bottom edge of the rear surface and a pair of additional surfaces 106 and 108 extending from the prow and intersecting the bottom and the side surfaces. The intersection of the rear, the side and the additional surfaces with the bottom surface defines, illustratively, a pentagonal stylus footprint. The keel-tipped stylus is constructed such that an apex of the pentagonal footprint is located on the prow 96.

In the embodiment of FIGS. 6 and 7, the shoulders 92 and 94 are parallel to the bottom surface 104 of the constricted terminal portion 90. Alternately, the shoulders 92 and 94 may be flared relative to the bottom surface 104 as shown in FIGS. 8–11.

FIGS. 8 and 9 show successive stages in the life of a keel-tipped stylus 80, having flared shoulders 92 and 94, riding in a given width groove disposed on the surface of a video disc 110 having a coating of conductive material 112 and a layer of dielectric deposit 114 overlying the conductive coating. It can be seen that the stylus life is extended by an order of magnitude since a greater volume of the stylus has to wear away before the stylus becomes unusable. Additionally, the stylus performance is significantly increased because the stylus electrode does not get wider as the stylus wears out and because the edges of the stylus electrode are spaced at a greater distance from the conductive coating in the adjacent grooves of the video disc as compared with a V-shaped stylus electrode.

Illustratively, the configuration of the keel-tipped stylus 80 is as follows: the angle included between the bevelled surfaces 86 and 88—42°, the height of the constricted portion 90—5 micrometers, the distance between the substantially parallel side surfaces of the constricted portion—3 micrometers, the fore-and-aft dimension of the constricted portion—8 micrometers, and the angle included between the prow 96 and the shoe 104—35°.

With this configuration, the life of the keel-tipped stylus is about twice the life of the previously mentioned V-tipped stylus and the increment in the signal-to-noise ratio is of the order of 3dB (average).

The keel-tipped stylus not only offers advantages in performance and stylus life, but it also is relatively easy to fabricate by modifying a V-shaped stylus (e.g., shown in FIG. 2) to obtain a keel-tipped stylus.

Figure 12:
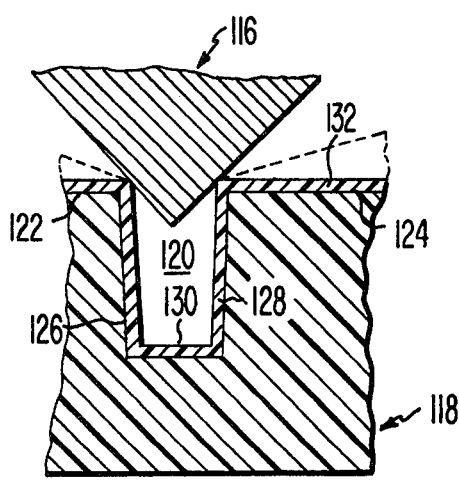
FIGS. 12 and 13 show a portion of a lapping disc suitable for forming the keel-tipped stylus of FIGS. 6 and 7.
Figure 13:
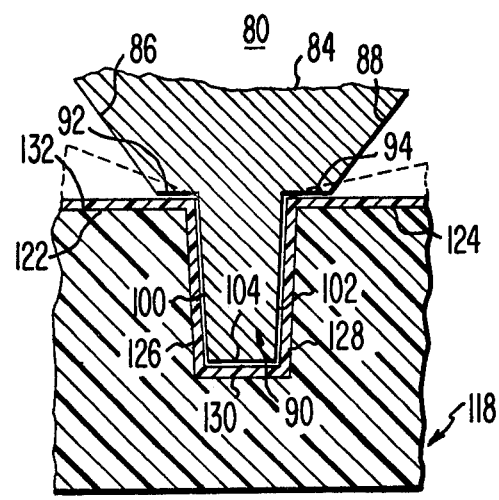

The keel-tipped stylus is formed by running the V-shaped stylus 116 on an abrasive lapping disc 118 with a deep coarse-pitched groove 120 as shown in FIG. 12. The lands 122 and 124 on the lapping disc 118 lap the shoulders 92 and 94 and the walls 126 and 128 of the abrasive groove 120 from the substantially parallel side surfaces 100 and 102 as shown in FIG. 13. The abrasive groove 120 can be deeper than the height of the keep tip 90 and the stylus footprint can be lapped later. Alternatively, as shown in FIG. 13, the bottom 130 of the abrasive groove 120 can be positioned such that it laps the stylus shoe 104.

The lapping disc 118 shown in FIGS. 12 and 13 provides a keel-tipped stylus of the form shown in FIGS. 6 and 7. By suitably modifying the lapping disc, as shown by the dotted lines in FIGS. 12 and 13 a keel-tipped stylus of the form shown in FIGS. 8-11 can be made.

The manufacture of the lapping disc 118 will now be described. A fairly flat and smooth copper clad substrate is coated with a thick coating (e.g., several micrometers) of photoresist. The photoresist coated substrate is exposed with an intense beam of energy (e.g., electron beam or light) of the desired width (e.g., 3.5 micrometers) along a spiral track of a coarse pitch. After developing the exposed photoresist coated substrate, the exposed photoresist region is removed to form a coarse spiral groove on the substrate. A metal stamper is obtained therefrom by a process such as electroless plating. The metal stamper is used to press plastic discs. The plastic discs may be made from the same material as video discs. An abrasive material, such as $SiO_2$ is deposited thereon to form an abrasive layer 132 as shown in FIGS. 12 and 13.

Keel-tipped styli, in accordance with embodiments of the present invention, have been successfully made from diamond, as well as from sapphire, support elements.

Use of the described keel-lapping procedure is not limited to factory production, it could be done in the home, a store or repair shop, or as a factory reconditioning operation to restore a worn stylus.

While the invention is described in the context of capacitive pickup styli, the principles are applicable as well to styli for pressure pickups, for example.

I claim:

1. A method of fabricating a keel-tipped stylus by modifying a tapering support element having a tip which is defined by a prow and a substantially flat V-shaped rear surface remote from said prow; said keel-tipped stylus being suitable for playing back prerecorded signals from a disc record groove of a given width and a given pitch; said method comprising the steps of:

introducing said tip of said tapering support element in an abrasive groove having a bottom wall, substantially parallel side walls separated by a distance less than said given width and lands extending away from said side walls; while establishing relative motion between said tapering support element and said abrasive groove along a line which is disposed in a plane substantially perpendicular to said V-shaped rear surface while holding said tapering support element in a relatively fixed orientation with respect to said abrasive groove;

said side walls of said abrasive groove forming side surfaces of a fore-and-aft constricted terminal portion of said tapering support element;

said lands of said abrasive groove forming shoulders interconnecting said constricted terminal portion with remainder of said tapering support element; and terminating said relative motion when said constricted terminal portion reaches a given height.

2. A method as defined in claim 1 further including the step of causing engagement between the bottom of said constricted terminal portion and said bottom wall of said abrasive groove to form a bottom surface of said constricted terminal portion prior to said termination of said relative motion.

3. A method as defined in claim 1 further including the step of lapping the bottom surface of said constricted terminal portion subsequent to said termination of said relative motion.

4. A method as defined in claim 1 further including the step of lapping said tapering support element to form a bottom surface substantially perpendicular to said V-shaped rear surface prior to said introduction of said tapering support element.

5. A method as defined in claim 1 wherein said abrasive groove forms a spiral groove on a lapping disc having a pitch coarser than said given pitch of said disc record.

6. A method as defined in claim 1 wherein said tapering support element has a coating of conductive material adherent to said V-shaped rear surface so as to form a stylus electrode.

7. A method as defined in claim 1 wherein said lands of said abrasive groove are constructed such that said shoulders are disposed parallel to the bottom surface of said constricted terminal portion.

8. A method as defined in claim 1 wherein said lands are constructed such that said shoulders are disposed flared relative to the bottom surface of said constricted terminal portion.

* * * * *